Jan. 1, 1963     D. A. KOHL     3,071,746
HUMIDITY SENSOR HAVING A DECREASED RESISTANCE RANGE
Filed Nov. 25, 1955     3 Sheets-Sheet 1

INVENTOR.
DOUGLAS A. KOHL
BY
Stuart R. Peterson
ATTORNEY

Jan. 1, 1963   D. A. KOHL   3,071,746
HUMIDITY SENSOR HAVING A DECREASED RESISTANCE RANGE
Filed Nov. 25, 1955   3 Sheets-Sheet 2
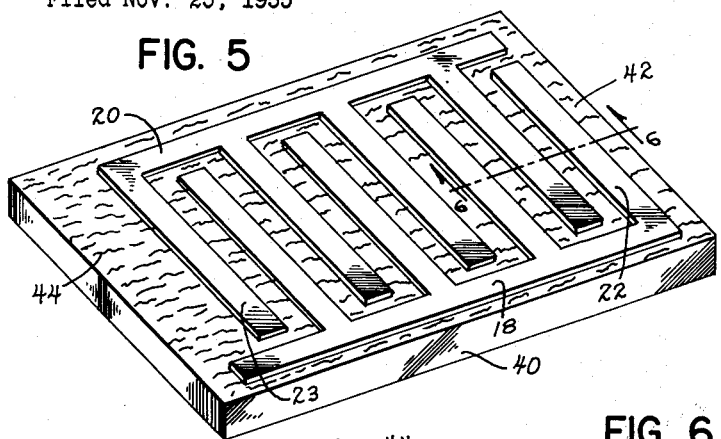
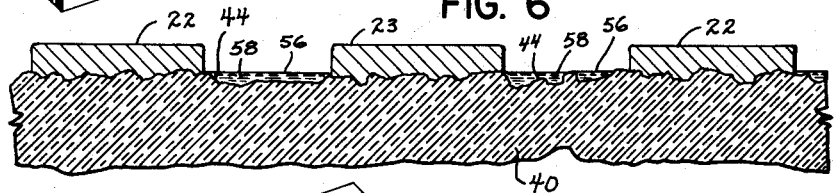
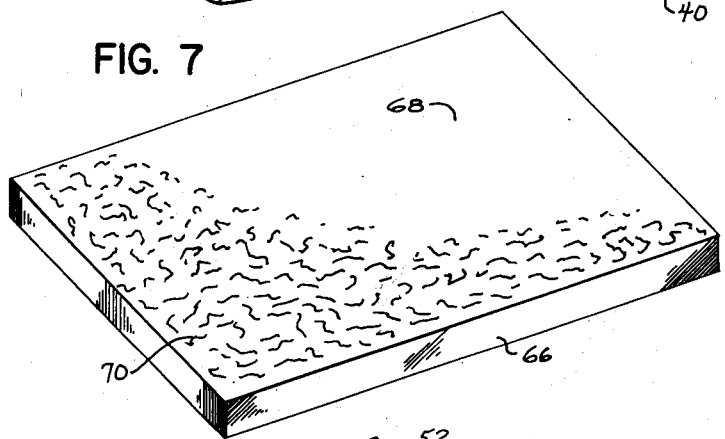
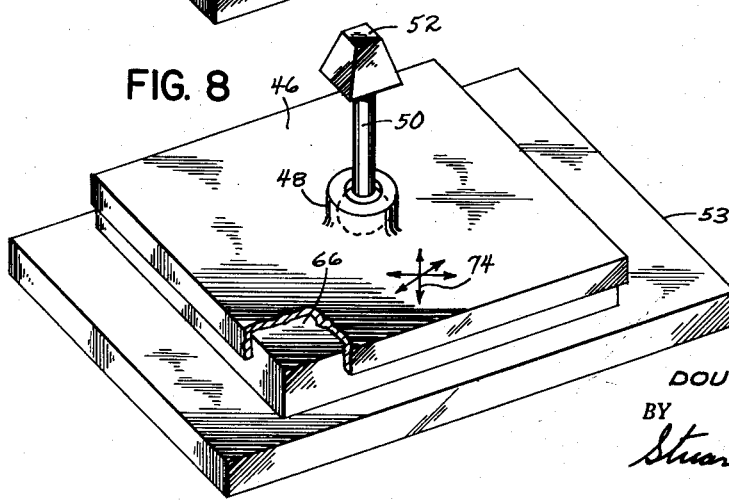
INVENTOR.
DOUGLAS A. KOHL
BY
*Stuart R. Peterson*
ATTORNEY INVENTOR.
DOUGLAS A. KOHL
BY
Stuart R. Peterson
ATTORNEY United States Patent Office 3,071,746
Patented Jan. 1, 1963

3,071,746
HUMIDITY SENSOR HAVING A DECREASED
RESISTANCE RANGE
Douglas A. Kohl, Osseo, Minn., assignor to General Mills,
Inc., a corporation of Delaware
Filed Nov. 25, 1955, Ser. No. 549,116
6 Claims. (Cl. 338—35)

This invention relates generally to humidity sensing devices and pertains more particularly to a humidity sensor having a preferred resistance range.

Certain nonporous materials having adsorbing characteristics are not wholly satisfactory for humidity sensing without physical modification. More specifically, it may be stated that practical requirements generally limit circuit resistances of humidity sensing elements to between $10^7$ to $10^8$ ohms. Unfortunately, humidity sensors of the adsorbing type have an extremely large ohmic range, some extending over as much as eight or nine decades of resistance. Hence, it can be appreciated that when this is the case then it is essential that the lower end of the range be in the neighborhood of between one hundred and ten thousand ohms. Materials which have been found to possess excellent adsorbing characteristics, with the exception of their respective resistance ranges for 10 to 100% relative humidity, are quartz (single crystal), fused quartz (poly crystalline) and glass (high silica content, i.e., 96% silica or over).

In this natural or normal condition the above-mentioned materials have a relatively smooth surface. However, it has been found that by roughening that surface which is to be used for measuring humidity the resistance range is appreciably lowered, that is lowered enough to bring it within limits of practical utility. Accordingly, one object of the present invention is to so lower the resistance range of certain adsorbing materials to the extent that these materials will find especial utility in the field of humidity sensing.

A further object of the invention is to provide a humidity sensor possessing the foregoing desiderata without introducing conditions that would adversely affect the functioning of the sensing elements in highly humid atmospheres or at elevated temperatures. In this regard, it is to be emphasized that the teachings of this invention avoid the use of coatings and the like which would be subject to deterioration from prolonged usage or from the conditions enumerated in the first sentence of this paragraph.

Still another object of the invention resides in the avoidance of any noticeable time lags or hysteresis effects by reason of the physical modification envisaged. Thus a humidity sensing element made in accordance with the teachings of the present invention will follow closely humidity changes, thereby affording a high degree of correlation between the actual humidity and that indicated by the sensor.

Other objects will be in part obvious, and in part pointed out in more detail hereinafter.

The invention accordingly consists in the features of construction, combination of elements and arrangement of parts which will be exemplified in the construction hereafter set forth and the scope of the application which will be indicated in the appended claims.

In the drawing:

FIG. 5 is a view similar to FIG. 3 but showing the element after the grids have been added;

FIG. 6 is a view similar to FIG. 2 but taken in the direction of line 6—6 of FIG. 5;

FIG. 7 is a view similar to FIG. 3 but showing a sensing element that has been either randomly ground or acid etched;

Figure 4:
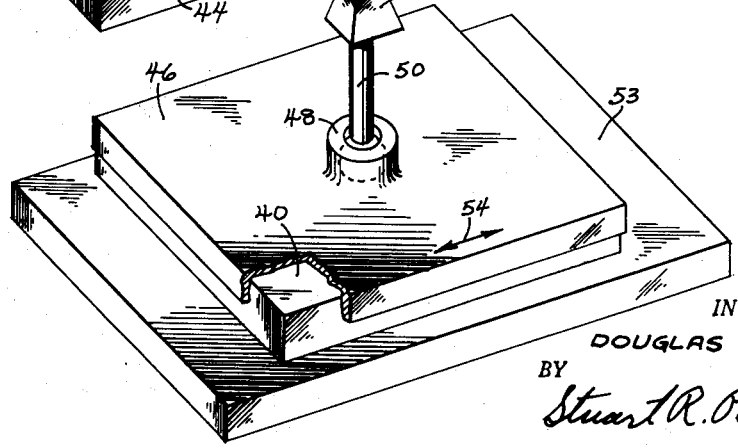
FIG. 4 is a perspective view illustrating one way in which the directional fine grinding depicted in FIG. 3 can be accomplished.
Figure 9:
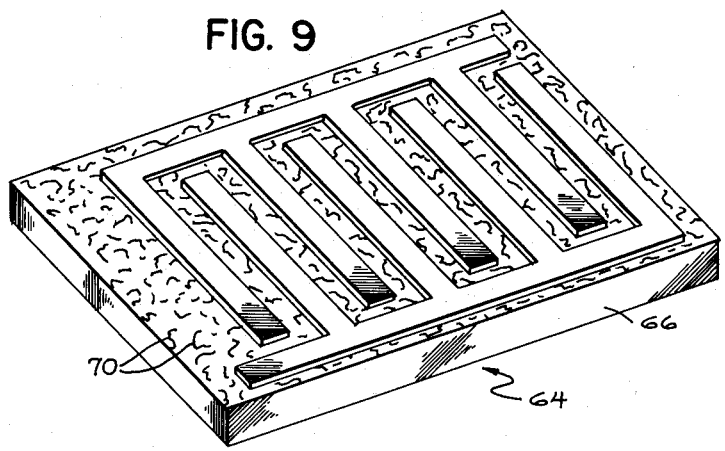

FIG. 8 corresponds closely to FIG. 4 but illustrates one way in which the suggested random fine grinding may be achieved;

FIG. 9 depicts the element of FIG. 7 after grids have been added; and

Figure 10:
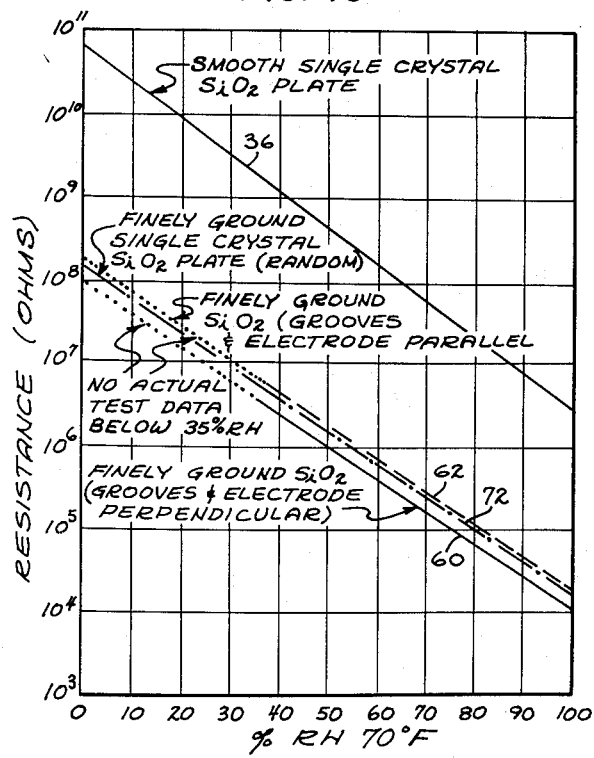

FIG. 10 presents a graphical comparison of various resistance ranges which are typical of certain sensing elements, both with and without the surface treatment contemplated by the invention.

As a basis for fully comprehending the benefits to be derived from a practicing of the invention, it is believed desirable to explain what is meant by "adsorbing" in contradistinction to the term "absorbing," inasmuch as the former term will be used throughout the ensuing description as well as in the appended claims. Therefore, wherever adsorbing material is mentioned herein a material is intended which will cause preferential attraction for water vapor molecules and while said molecules are in contact with the adsorber there is no chemical change of state and no irreversible action. A further categorical breakdown is also possible, there being two types of adsorption: (1) physical and (2) chemical. For the purpose of this discussion it may be said that we are not interested in chemical adsorption, this latter type involving what might be termed chemi-sorption which results in an irreversible change in energy level or chemical state. On the other hand, absorption occurs when water vapor molecules are actually combined through chemical reaction with the absorber, incorporated into the molecular structure of the absorber (for instance, water of crystallization), or there is a release of ions by virtue of a binding action such that the conduction of electric current by the ions may result in physical changes. Typical of such absorbing reactions are the swelling of cellulose and ion-exchange resins.

Figure 1:
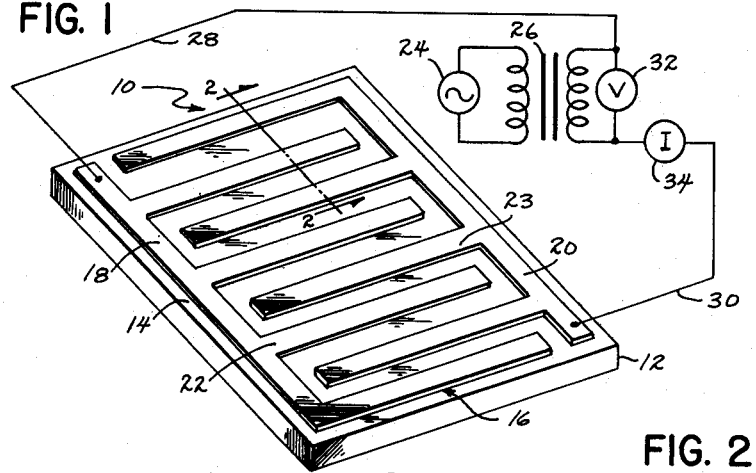
FIGURE 1 is a perspective view of a completed humidity sensor embodying a sensing element that has not received physical treatment as taught by the present invention.
Figure 2:
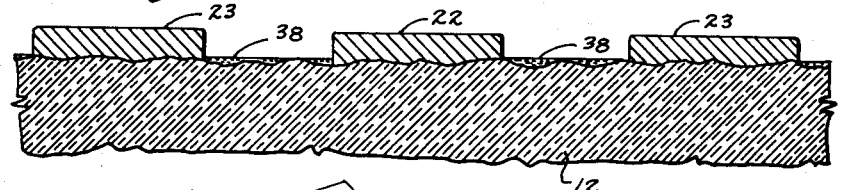
FIG. 2 is a microscopic cross sectional view taken in the direction of line 2—2 of FIG. 1.

Referring now to FIGS. 1 and 2 of the drawing, the humidity sensor 10 there depicted is presented largely for the purpose of illustrating what has been the state of the prior art so that the improvement provided by the instant invention may be better appreciated. The sensor 10 includes a base or element 12, which we will assume to be a piece of pure quartz, having a smooth upper surface 14 upon which is evaporated a grid structure 16 of noble metal such as gold. The grid structure 16 is comprised of electrically distinct electrodes 18 and 20, each having interleaved fingers 22 and 23, respectively, which are spaced apart from each other.

There is an A.C. source 24 and a transformer 26 for energizing the grid structure 16, one conductor 28 being connected to the electrode 18 and another conductor 30 connected to the other electrode 20. To avoid undesirable polarization effects, an A.C. frequency of greater than 15 cycles per second should be impressed upon the electrodes. By means of a voltmeter 32 and ammeter 34 combination the voltage and current may be measured and by Ohm's law $$\left(R_\mathrm{h} = \frac{V}{I}\right)$$

the resistance for any given humidity conditions may be calculated.

A typical resistance range curve 36 appears in FIG. 10 for the sensor of FIGS. 1 and 2, the sensor resistance in ohms being plotted against relative humidity in percent.

Perhaps the reason for the height of the curve 36 may be better understood by now focussing attention on FIG. 2. In this figure an adsorbed water layer 38 is indicated. This layer 38 is indicative of a specific humidity condition prevailing at the moment and variation of this layer by the accumulation of more or less moisture is of course responsible for producing the resistance curve 36. At any rate notice should be taken of the relative thinness of this layer 38 as compared with the layer (still to be described) shown in FIG. 6. It is to be borne in mind that the drawing is largely schematic with respect to scale and water layer representation.

Figure 3:
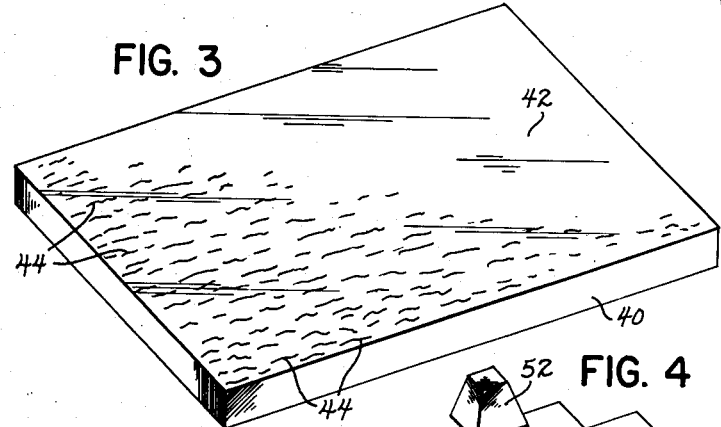
FIG. 3 is a perspective view of a sensing element before application of the grids comprising a quartz crystal that has been subjected to physical modification in the form of directional fine grinding.

Turning now to the sensor illustrated in FIGS. 3–5 there is shown an adsorbing element 40 of quartz which has been roughened by grinding in one direction only with #500 grit or finer. The completed surface has been given the reference numeral 42 and it is to be observed that a multiplicity of elongated pockets 44 appear in this surface 42, all oriented with their major axes extending in the same general direction. Some of these pockets appear in a more pronounced form in FIG. 6.

For the purpose of achieving the above-mentioned grinding, the adsorbing element 40 is placed in a holder 46 having a ball and socket joint located at 48 and an upstanding shank 50 equipped with a tapered head 52 by which the holder can be attached to a chuck of any suitable driving mechanism, such as a planer or telescope lens grinder (neither of which is shown). The element 40 is brought to bear upon a base plate 53 of material softer than the sensing element, and by reason of an interposed slurry of water or other suitable non-contaminating vehicle carrying the #500 or finer grit the grinding is effected. Since we are here concerned with directional grinding an arrow 54 has been applied to the holder 46 to indicate the reciprocable, rectilinear path the holder in this instance traverses.

As in the prior art situation pictorially presented in FIGS. 1 and 2, a layer 56 of adsorbed water will form under humidity conditions similar to those existing in the earlier referred to figures. By reason of the pockets 44, though, small "pools" of water 58 will form, these pools 58 having the end effect of lowering the resistance of the layer 56. In some respects the formation of "pools" or elongated regions of greater adsorptive probability is similar to forming parallel paths of conductive material, adsorbed water between the electrodes thus achieving increased conductance. Because the electrostatic field between the electrodes is perpendicular to the electrodes an oriented deposition of adsorbed water parallel with the lines of force increases conduction over a random distribution. This analogy is given solely for the purpose of aiding in the understanding of the benefits to be derived, any actual reason for such happening in all likelihood being due to a more complicated molecular theory that need not be substantiated for a practicing of the invention herein exemplified.

Inasmuch as the grid structure for the sensor 40 may be produced in the same manner as the earlier mentioned grid structure and can be of the same metal, the grid forming a part of this sensor bears the same reference numeral. The feature to be stressed here is that the electrode fingers 22 and 23 are applied transversely to the major axes of the elongated pockets 44 (see FIG. 5). Reference has already been made to curve 36 and a second curve 60 is indicative of the resistance range obtainable with the oriented pocket arrangement just described for the sensor 40. For the purpose of affording an interesting comparison with a sensor (not pictured) having pockets oriented with their major axes extending generally parallel to the electrode fingers 22 and 23, a third curve 62 is shown, this third curve falling between the curves 36 and 60. Thus it is believed evident that the particular orientation selected, that is, having the pockets extend normal to the fingers 22 and 23, is an improvement over having them extend parallel to said fingers and a vast improvement over not roughening the surface at all as brought out by the first mentioned curve 36.

Attention is now directed to FIGS. 7–9 where a third humidity sensor 64 is set forth. This sensor comprises an element 66 of quartz, just as in the case of the other elements 12 and 40 so as to permit comparing the performances of each. This element differs from the element 40 by reason of its surface 68 which is finely ground at random. Consequently, the pockets labeled 70 extend in many different directions. Owing to this random character or lack of orientation, the resistance curve 72 (FIG. 10) derivable by virtue thereof is not quite as good, practically speaking, as when the pockets are perpendicularly oriented (see curve 60) but somewhat better than when disposed in a parallel configuration (see curve 62).

The same equipment may be employed for the random grinding procedure as for the directional one. Accordingly, FIG. 8 differs from FIG. 4 solely by virtue of the arrows 74, these arrows representing motions that are in different directions.

As before, the formation of the "pools" 58 may be likened to increasing the cross-sectional area of the metallic electrical conductors. The pools being regions of relatively high conductivity scattered throughout the inter-electrode space, act to increase the overall conductivity by virtue of the fact that the total amount of water molecules bound to the surface is greater for a correspondingly same humidity as contrasted to a smooth surface.

In lieu of utilizing the random fine grinding of the element 66, the roughness characteristics can be simulated by resort to acid etching. In this situation, the element would be dipped into the acid solution or exposed to hot acid fumes and left only long enough to form the pockets. Because there would be no control over the way in which these pockets extend, they would assume a random configuration like those produced by random grinding.

As previously, the grid structure can be identical with those already referred to and hence the same reference numeral has again been used.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A humidity sensor comprising a nonporous adsorbing base of high electrical resistivity having a roughened surface providing a multiplicity of moisture receiving pockets, and metal grids superimposed upon said roughened surface.

2. A humidity sensor in accordance with claim 1 in which said adsorbing base is selected from the group consisting of quartz, fused quartz, and high silica glass.

3. A humidity sensor in accordance with claim 1 in which said surface is finely ground.

4. A humidity sensor in accordance with claim 1 in which said surface is finely etched.

5. A humidity sensor comprising a nonporous adsorbing base of high electrical resistivity having a finely ground surface providing a multiplicity of small pockets into which moisture may collect, said pockets being elongated and oriented in the same general direction, and interleaved noble metal grids superimposed on said ground surface.

6. A humidity sensor in accordance with claim 5 in which the general direction of pocket orientation is substantially normal to the interleaved grids.

References Cited in the file of this patent

UNITED STATES PATENTS

| 4,239 | Baldamus | Oct. 25, 1845 |
| 2,058,348 | Nichols | Oct. 20, 1936 |
| 2,356,910 | Bailey | Aug. 29, 1944 |
| 2,613,302 | Gurewitsch | Oct. 7, 1952 |
| 2,707,880 | Wannamaker | May 10, 1955 |
| 2,804,593 | Estienne | Aug. 27, 1957 |

FOREIGN PATENTS

| 645,648 | Great Britain | Nov. 8, 1950 |

OTHER REFERENCES

Journal of the American Ceramic Society, vol. 27, No. 10, October 1944, pages 299–305.

Lichtgarn: "A New Method of Measuring Humidity," Instruments, April 1947, pp. 336–8.